US012779460B2

(12) United States Patent
Lee et al.

(10) Patent No.: US 12,779,460 B2
(45) Date of Patent: Nov. 3, 2026

(54) ELECTRODE APPARATUS AND METHOD FOR NEURAL SIGNAL MEASURING

(71) Applicant: SAMSUNG ELECTRONICS CO., LTD., Suwon-si (KR)

(72) Inventors: Jaechun Lee, Suwon-si (KR); Kitae Park, Suwon-si (KR); Chisung Bae, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 732 days.

(21) Appl. No.: 18/318,323

(22) Filed: May 16, 2023

(65) Prior Publication Data

US 2024/0189813 A1 Jun. 13, 2024

(30) Foreign Application Priority Data

Dec. 9, 2022 (KR) ........................ 10-2022-0171633

(51) Int. Cl.
*B01L 3/00* (2006.01)
*G01N 27/327* (2006.01)

(52) U.S. Cl.
CPC ... *B01L 3/502715* (2013.01); *B01L 3/502707* (2013.01); *G01N 27/327* (2013.01); *B01L 2200/12* (2013.01); *B01L 2300/0645* (2013.01)

(58) Field of Classification Search
CPC .. G01N 27/02; G01N 27/327; G01N 33/4833; B01L 3/502707; B01L 3/502715; B01L 2200/12; B01L 2300/0645
USPC ...................................................... 422/82.01
See application file for complete search history.

(56) References Cited

U.S. PATENT DOCUMENTS 4,969,468 A * 11/1990 Byers ...................... A61B 5/287 29/829
5,187,096 A * 2/1993 Giaever ............. G01N 33/4836 324/692
7,058,455 B2 6/2006 Huie, Jr. et al.
7,244,349 B2 * 7/2007 Vogel .................... B01L 3/5085 435/173.6
8,323,955 B1 * 12/2012 Okandan .......... G01N 33/48728 435/173.6

(Continued)

FOREIGN PATENT DOCUMENTS

CN 113652355 A * 11/2021 ............ C12M 23/16
JP 2007-518541 A 7/2007
JP 2009204407 A * 9/2009

OTHER PUBLICATIONS

Robinson, J. T. et al, Nature Nanotechnology 2012, 7, 180-184 with 9 pages of supplementary information. (Year: 2012).*

(Continued)

*Primary Examiner* — Arlen Soderquist
(74) *Attorney, Agent, or Firm* — NSIP Law

(57) ABSTRACT

An apparatus includes a housing including a hollow inside; a cover configured to cover the housing and support a portion of a biological cell on the cover; an opening formed through the cover and configured to expose at least a portion of the cell to the hollow inside of the housing; an electrode base disposed on a bottom of the housing; and one or more electrode rods arranged between the electrode base and the cover, and configured to support the cover, wherein the electrode base and/or the one or more electrode rods are arranged for sensing an electrical signal from at least another portion of the cell.

12 Claims, 10 Drawing Sheets

(56) References Cited

U.S. PATENT DOCUMENTS

| | | | | |
|---|---|---|---|---|
| 9,006,014 | B2 | 4/2015 | Mujeeb-U-Rahman et al. | |
| 10,434,301 | B2 * | 10/2019 | Wingeier | A61N 1/0456 |
| 2002/0195337 | A1 * | 12/2002 | Osipchuk | G01N 33/48728 204/400 |
| 2004/0146849 | A1 * | 7/2004 | Huang | G01N 33/48728 435/287.1 |
| 2004/0214312 | A1 * | 10/2004 | Tyvoll | G01N 33/5008 435/288.5 |
| 2005/0203601 | A1 | 9/2005 | Palanker et al. | |
| 2007/0231850 | A1 * | 10/2007 | Geoffrey | C12M 25/02 435/29 |
| 2007/0293749 | A1 * | 12/2007 | Zhou | A61N 1/0543 600/372 |
| 2009/0017197 | A1 * | 1/2009 | Zhang | G01N 33/5438 204/403.01 |
| 2010/0248284 | A1 * | 9/2010 | Chen | G01N 33/5438 422/82.01 |
| 2010/0330612 | A1 * | 12/2010 | Sorensen | G01N 33/48728 435/287.1 |
| 2011/0082413 | A1 * | 4/2011 | Ready | A61N 1/05 604/20 |
| 2012/0161130 | A1 | 6/2012 | Oda et al. | |
| 2014/0106988 | A1 * | 4/2014 | Gillis | G01N 27/417 506/12 |
| 2019/0328261 | A1 * | 10/2019 | Shakour | A61N 1/322 |
| 2021/0008363 | A1 | 1/2021 | Cui et al. | |
| 2021/0255176 | A1 * | 8/2021 | Mann | G01N 33/567 |
| 2021/0370053 | A1 | 12/2021 | Jin et al. | |

OTHER PUBLICATIONS

Nick, C. et al, Microsystem Technologies 2014, 20, 1849-1857. (Year: 2014).*

Abbott, J. et al, Nature Nanotechnology 2017, 12, 460-466 with 30 pages of supplementary information. (Year: 2017).*

Abbott, J. et al, Accounts of Chemiccal Research 2018, 51, 600-608. (Year: 2017).*

Guo, L., Journal of Neural Engineering 2020, 17, article 016017, 11 pages with 14 pages of supplementary material. (Year: 2020).*

Ham, Donhee, et al. "Neuromorphic electronics based on copying and pasting the brain." *Nature Electronics* 4.9 (Sep. 2021): pp. 635-644.

Abbott, Jeffrey, et al. "CMOS nanoelectrode array for all-electrical intracellular electrophysiological imaging." *Nature nanotechnology* 12.5 (Feb. 2017): pp. 460-466.

Zheng, Tianyang, et al. "Generation of chip based microelectrochemical cell arrays for long-term and high-resolution recording of ionic currents through ion channel proteins." *Sensors and Actuators B: Chemical* 205 (2014): pp. 268-275.

Yuk, Hyunwoo, Baoyang Lu, and Xuanhe Zhao. "Hydrogel bioelectronics." *Chemical Society Reviews* 48.6 (2019): pp. 1642-1667.

Shokoohimehr, Pegah, et al. "High-Aspect-Ratio Nanoelectrodes Enable Long-Term Recordings of Neuronal Signals with Subthreshold Resolution." *Small* 18.22 (May 8, 2022): 2200053.

Abbott, Jeffrey, et al. "A nanoelectrode array for obtaining intracellular recordings from thousands of connected neurons." *Nature biomedical engineering* 4.2 (Feb. 2020): pp. 232-241.

Abbott, Jeffrey, et al. "The design of a CMOS nanoelectrode array with 4096 current-clamp/voltage-clamp amplifiers for intracellular recording/stimulation of mammalian neurons." *IEEE journal of solid-state circuits* 55.9 (2020): 2567-2582.

Lu, Miao, et al. "Flexible and disposable immunosensors based on layer-by-layer self-assembled carbon nanotubes and biomolecules." *Sensors and Actuators A: Physical* 150.2 (2009): pp. 280-285.

Chen, Yuanjing, et al. "Fabrication of polyimide sacrificial layers with inclined sidewalls based on reactive ion etching." *Aip Advances* 4.3 (2014): 031328.

Linder, Vincent, et al. "Water-soluble sacrificial layers for surface micromachining." *small* 1.7 (2005): pp. 730-736.

Kumar, Prem, et al. "Sacrificial layer optimization for RF MEMS switches." *Microsystem Technologies* 27 (Aug. 14, 2020): pp. 2147-2152.

Debéda, Hélène, et al. "The Role of Sacrificial and/or Protective Layers to Improve the Sintering of Electroactive Ceramics: Application to Piezoelectric PZT-Printed Thick Films for MEMS." *Ceramics* 3.4 (Nov. 2020): pp. 453-475.

Liu, Yuxin, et al. "Soft conductive micropillar electrode arrays for biologically relevant electrophysiological recording." *Proceedings of the National Academy of Sciences* 115.46 (2018): pp. 11718-11723.

Proctor, Christopher M., Jonathan Rivnay, and George G. Malliaras. "Understanding volumetric capacitance in conducting polymers." *Journal of Polymer Science Part B: Polymer Physics* 54.15 (2016): pp. 1433-1436.

Michael Bernstein "OmniCoat Processing Standard Operating Procedure" Faculty Supervisor: Prof. Robert White, Mechanical Engineering (x72210) Nov. 23, 2011.

* cited by examiner

ELECTRODE APPARATUS AND METHOD FOR NEURAL SIGNAL MEASURING

CROSS-REFERENCE TO RELATED APPLICATIONS

This application claims the benefit under 35 USC § 119(a) of Korean Patent Application No. 10-2022-0171633, filed on Dec. 9, 2022, in the Korean Intellectual Property Office, the entire disclosure of which is incorporated herein by reference for all purposes.

BACKGROUND

1. Field

The following description relates to an apparatus and method with neural signal measuring a cell of biological cells.

2. Description of Related Art

In a system that analyzes large-scale biological neural networks, technology for measuring an electrical signal of a cell is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for measuring an electrical signal of a cell may include a housing including a hollow inside therein; a cover configured to cover the housing and support a portion of a biological cell on the cover; an opening formed through the cover and configured to expose at least a portion of the cell to the hollow an inside of the housing; an electrode base disposed on a bottom of the housing; and one or more an electrode rods arranged between connected to the electrode base and configured to support the cover, and configured to support the cover, wherein the electrode base and/or the one or more electrode rods are arranged for sensing an electrical signal from at least another portion of the cell.

The one or more electrode rods may include a plurality of electrode rods, wherein the plurality of electrode rods is provided in a state of being are spaced apart from each other on the electrode base.

At least one of the plurality of electrode rods may be respectively disposed to surrounding the opening.

The electrode base and the electrode rods may be integrally formed.

The apparatus may further include an electrode cover attached to disposed on the cover and facing the electrode base.

The electrode cover may be integrally formed with the one or more electrode rods.

The apparatus may further include an electrode body disposed on a sidewall of the housing other than the electrode base, and facing the one or more electrode rods.

The electrode body may be integrally formed with the electrode base.

The apparatus may further include a conductive polymer filled in the hollow inside of the housing to provide an electrical connection of the electrical signal generated by the at least other portion of cell to the electrode base and/or the one or more electrode rods.

In another general aspect, an apparatus for measuring an electrical signal of a cell may include a housing including a hollow inside therein; a cover configured to cover the housing and support a portion of a biological cell on the cover; an opening formed through the cover and configured to expose at least a portion of the cell to the hollow inside of the housing; an electrode base disposed on a bottom of the housing; and a conductive polymer material filled in the hollow inside of the housing to provide an electrical connection of an electrical signal generated by at least another portion of the cell to the electrode base.

The apparatus may further include one or more electrode rods configured to support the cover with respect to the electrode base.

In another general aspect, a method of manufacturing an apparatus for measuring an electrical signal of a biological cell may include forming a conductive base and a house disposing insulative material on the conductive base; generating respective electrode rods extending from the conductive base by selectively removing the insulative material; disposing sacrificial material in the housing to cover at least respective portions of the respective electrode rods; forming a cover, on the sacrificial material, to cover a portion of an inside of the housing; and removing the sacrificial material.

Other features and aspects will be apparent from the following detailed description, the drawings, and the claims.

Figure 1:
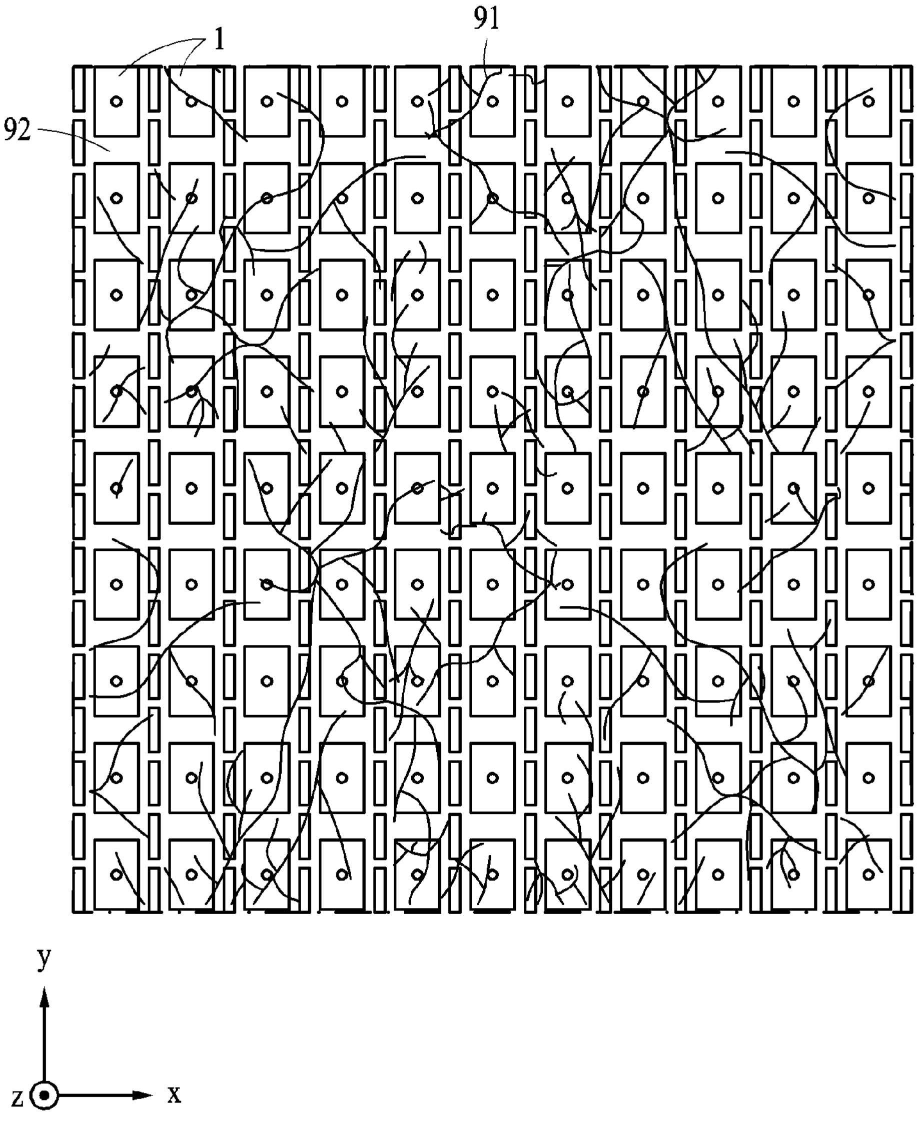
FIG. 1 illustrates an example electrical signal sensing system including an apparatus for measuring an electrical signal of a cell according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

FIG. 1 illustrates an example electrical signal sensing system including an apparatus for measuring an electrical signal of a cell according to one or more embodiments.

Referring to FIG. 1, the example electrical signal sensing system may sense an electrical signal generated by cells 91. As a non-limiting example, the cells 91 may be nerve cells. The cells 91 may generate an electrical signal and exchange electrical signals with each other. In an example, the electrical signal sensing system may be provided in a state of being immersed in an aqueous solution. Respective electrical signals generated by the cells 91 may be transmitted to electrodes through the aqueous solution.

The electrical signal sensing system may include a system base 92 and one or more apparatuses 1, each of which is configured to measure the electrical signal of a corresponding cell of the cells 91. For the convenience of description, the apparatus 1 for measuring the electrical signal of the cell 91 is referred to as a sensing apparatus 1 hereinafter. A plurality of sensing apparatuses 1 may be provided. The sensing apparatus 1 may be mounted on the system base 92. The system base 92 may include a circuit that collects and analyzes the signal(s) sensed by the sensing apparatus(es) 1. The system base 92 and the sensing apparatus(es) 1 may be electrically and physically connected to one another.

The plurality of sensing apparatuses 1 may be provided on a plane, where the plurality of sensing apparatuses 1 may be provided in a state of being arranged horizontally and vertically side by side in the plane. The plurality of sensing apparatuses 1 may support the respective cells 91 and sense the electrical signals generated by the respective cells 91. The plurality of sensing apparatuses 1 may be disposed side by side on an xy plane. The electrical signal generated by each cell 91 may move to a z-axis direction through the aqueous solution and enter inside the sensing apparatus 1. The sensing apparatus 1 may include an electrode for receiving a corresponding electrical signal.

Figure 2:
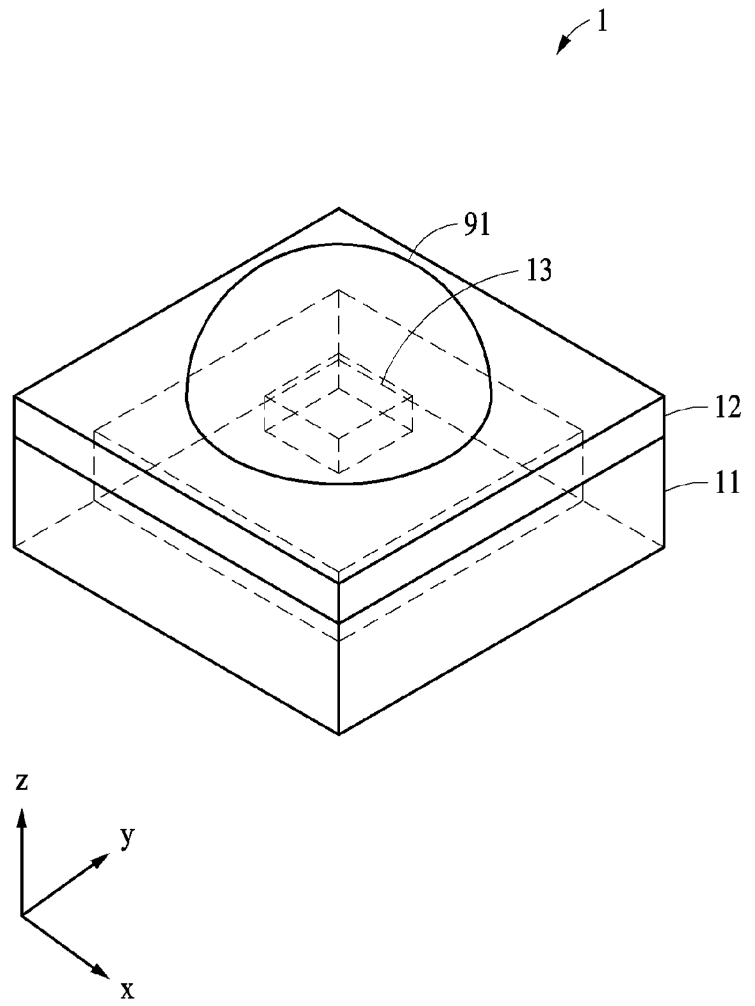
FIG. 2 illustrates an example apparatus for measuring an electrical signal of a cell according to one or more embodiments.
Figure 3:
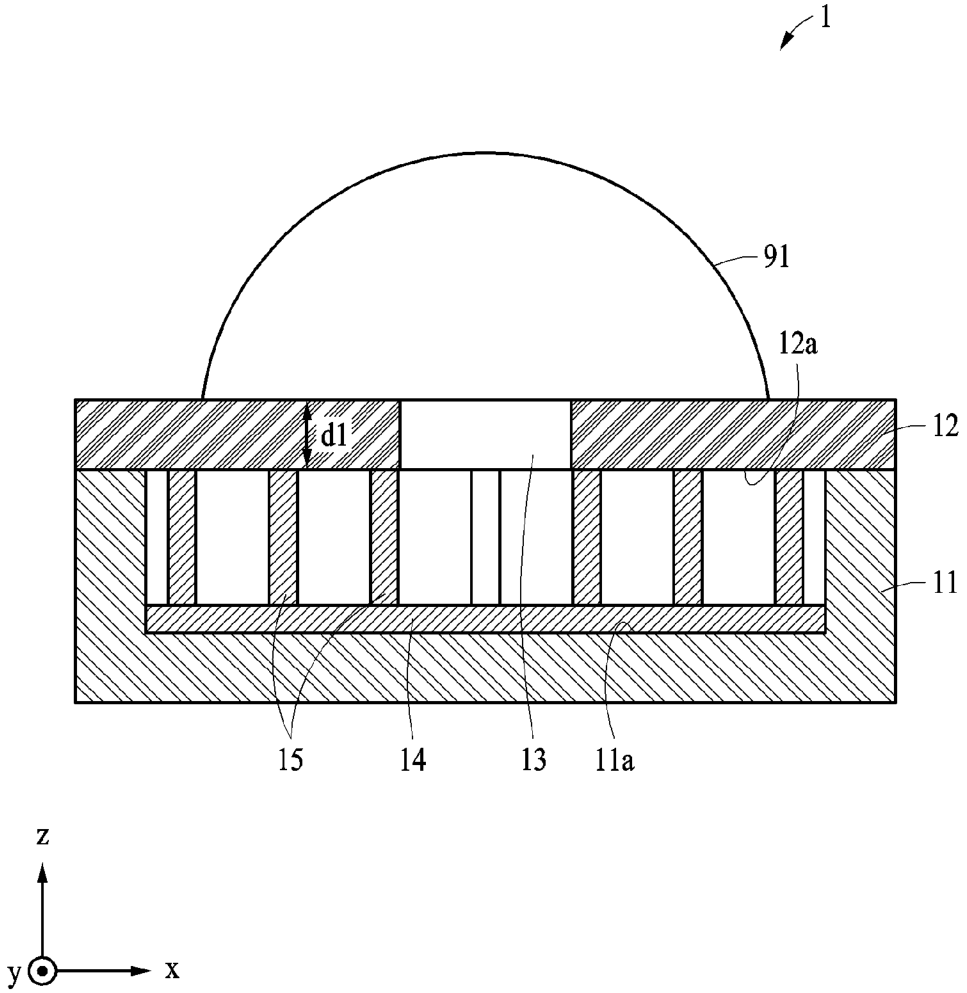
FIG. 3 illustrates an example apparatus for measuring an electrical signal of a cell according to one or more embodiments.
Figure 4:
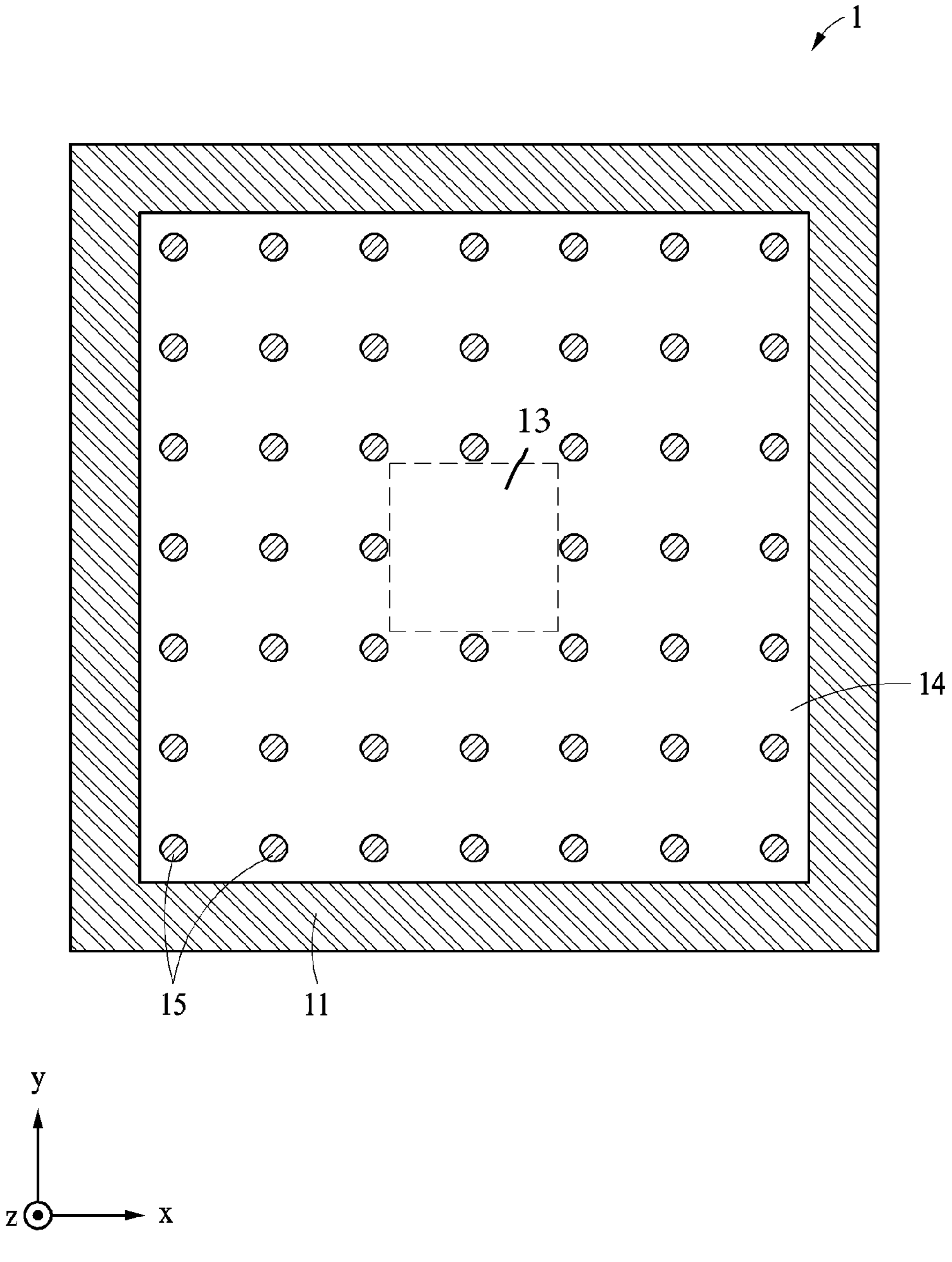
FIG. 4 illustrates an example apparatus for measuring an electrical signal of a cell taken along a different cutting plane from that of FIG. 3 according to one or more embodiments.

FIG. 2 illustrates an example apparatus for measuring an electrical signal of a cell, FIG. 3 illustrates an example apparatus for measuring an electrical signal of a cell, and FIG. 4 illustrates an example apparatus for measuring an electrical signal of a cell taken along a different cutting plane from that of FIG. 3.

Referring to FIGS. 2 through 4, the example sensing apparatus 1 may be configured to sense electrical signals generated by the cells 91. For example, the sensing apparatus 1 may be configured to support a cell 91. The electrical signal generated in the cell 91 may be transmitted to an electrode inside the sensing apparatus 1 through an aqueous solution provided inside the sensing apparatus 1. The electrical signal transmitted to the electrode may be transmitted to a sensing circuit, which may be provided on the system base 92 (see FIG. 1) as a non-limiting example. As shown in FIGS. 2 and 3, the sensing apparatus 1 may include a housing 11, a cover 12, an opening 13, an electrode base 14, and one or more electrode rods 15.

The housing 11 may have a hollow therein. The aqueous solution may be filled inside the hollow of the housing 11. The aqueous solution may transmit the electrical signal generated by the corresponding cell 91 to the corresponding electrode. Here, the electrode may include the electrode base 14 and/or the one or more electrode rods 15. The electrode may have a three-dimensional (3D) shape inside the housing 11. The electrode may not be simply exposed to the aqueous solution in a plane, that is, in a two-dimensional (2D) shape, but may be exposed to the aqueous solution tridimensionally, that is, in a 3D shape. When the electrode is exposed to the aqueous solution in a 3D shape, a surface area of the electrode may be relatively large compared to the electrode exposed to the aqueous solution in a 2D shape. When the surface area of the electrode is relatively large, an impedance of the sensing apparatus 1 may be relatively reduced. When the impedance of the sensing apparatus 1 is relatively reduced, the corresponding electrode may effectively sense the electrical signal generated by the corresponding cell 91.

The cover 12 may be configured to cover the housing 11 and support the cell 91. Also, the cover 12 may be configured to separate the cell 91 from the electrode so that the cell 91 does not directly contact the electrode. For example, the cover 12 may be integrally formed with the housing 11.

The opening 13 may be formed through the cover 12, and guide fluid flow between the inside and the outside of the housing 11. The cell 91 may be disposed at an upper end of the opening 13. For example, at least a portion of the cell 91 may be exposed to an inside (e.g., the hollow) of the housing 11. The electrical signal generated by the cell 91 may pass through the opening 13 in a −z direction and be transmitted to the inside of the housing 11.

In one example, the opening 13 may have a wide pillar shape so that the opening 13 may have a relatively low path impedance compared to the opening 13 having a narrow pillar shape. In an example, in order for the opening 13 to have a wide pillar shape, an area of the opening 13 on the xy plane may be increased while a z-axis depth of the opening 13 is the same. When the area of the opening 13 on the xy plane is excessively increased, the cell 91 may pass through the opening 13 and enter inside the housing 11 unintentionally. In order to prevent this situation from occurring, the z-axis depth of the opening 13 may be reduced.

For example, to reduce the z-axis depth of the opening 13, a thickness d1 of the cover 12 may be reduced, but the cover 12 may be damaged due to weights of the cover 12 and the cell 91. Thus in an example, the structural stability of the sensing apparatus 1 may be increased through the one or more electrode rods 15, which may be configured to support the cover 12. As the one or more electrode rods 15 may withstand a load of the cover 12 and the cell 91, the thickness d1 of the cover 12 may be formed relatively thinner compared to an example without the electrode rods 15 and with a larger z-axis depth of the opening 13. Since the path impedance is thus reduced, the electrode (including the electrode base 14 and electrode rods 15) may more sensitively sense the electrical signal generated by the cell 91.

In non-limiting examples, the electrode base 14 may be disposed on a bottom of the housing 11, the electrode base 14 may be disposed inside the housing 11, and the electrode base 14 may be provided in contact with a bottom surface 11*a* provided inside the housing 11.

The one or more electrode rods 15 may be connected to the electrode base 14. A length direction of the one or more electrode rods 15 may be formed in the z-axis direction. One end of the electrode rod 15 may be connected to the electrode base 14 and the other end of the electrode rod 15 may be connected to and support the cover 12. In one example, the other end of the electrode rod 15 may be provided in contact with a lower surface 12*a* of the cover 12, and thus support the load of the cover 12.

As shown in FIG. 3, a plurality of electrode rods 15 may be provided on the electrode base 14 spacing apart from each other. The plurality of electrode rods 15 may be provided on the xy plane spacing apart from each other. A space through which fluid flows may be provided between two adjacent ones of the plurality of electrode rods 15. The plurality of electrode rods 15 may be provided in parallel in the length direction of the electrode rods 15. Although the example in FIG. 4 shows the number of electrode rods 15 is 48 in total, but is not limited thereto. The plurality of electrode rods 15 may be used to increase the surface area of the electrode. In one example, side surfaces of the plurality of electrode rods 15 and portions of the electrode base 14 that are not covered by the electrode rod 15 may be used as surface areas of the electrode. Thus, compared to a typical electrode used to interact with biological cells in which only the electrode base 14 is provided, an example electrode according to one or more embodiments including the electrode base 14 and the electrode rods 15 may have a relatively large surface area.

The plurality of electrode rods 15 may be disposed to surround the opening 13. For example, referring to FIG. 4, eight electrode rods 15 may be provided to surround the opening 13 based on a size of the opening 13. According to this non-limiting example configuration, the structural stability of the sensing apparatus 1 may be increased.

As a non-limiting example, the electrode rods 15 and the electrode base 14 may be integrally formed.

Figure 5:
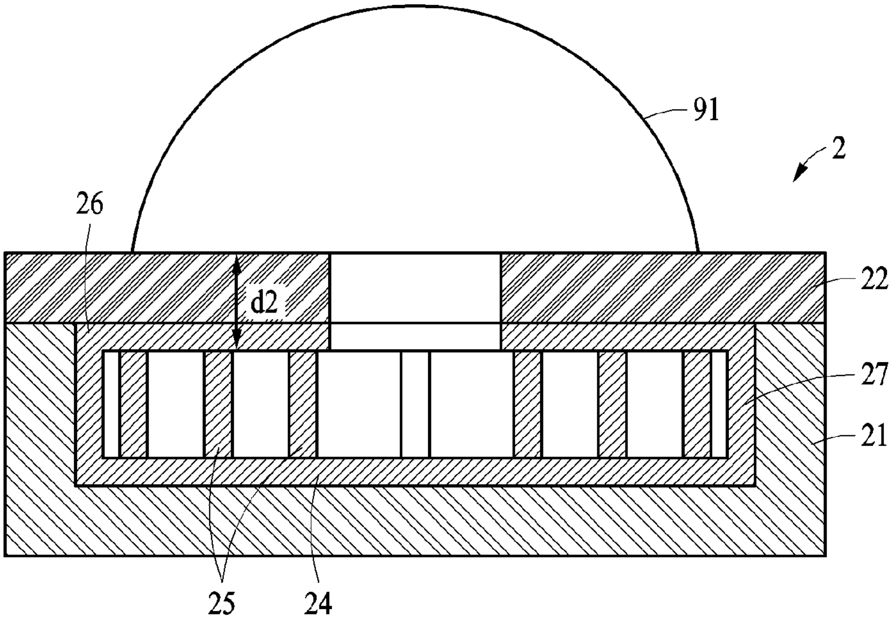
FIG. 5 illustrates an example apparatus for measuring an electrical signal of a cell according to one or more embodiments.

FIG. 5 illustrates an example apparatus for measuring an electrical signal of a cell according to one or more embodiments.

Referring to FIG. 5, a sensing apparatus 2 may be configured to support the cells 91, and sense an electrical signal generated by the cells 91. The sensing apparatus 2 may include a housing 21, a cover 22, an opening, an electrode base 24, electrode rods 25, an electrode cover 26, and an electrode body 27. Here, the electrode may include at least one of the electrode base 24, the electrode rods 25, the electrode cover 26, or the electrode body 27. At least one of the electrode rods 25, the electrode cover 26, or the electrode body 27 may be configured to increase the surface area of the electrode compared to a typical electrode in which only the electrode base 24 is provided. As the surface area of the example electrode in FIG. 5 is relatively large compared to the typical electrode, the impedance of the sensing apparatus 2 may decrease.

The electrode cover 26 may be disposed on the cover 22 and face the electrode base 24. In one example, the electrode cover 26 may be integrally formed with the electrode rods 25. The electrode cover 26 and the electrode rod 25 may be configured to support a load of the cover 22. A thickness d2 of an opening path may be formed relatively thin with the configuration of the electrode cover 26 and the electrode rods 25. The sensing apparatus 2 may have a relatively low path impedance.

The electrode body 27 may be disposed around a sidewall of the housing 11 and face the electrode rod 25. The electrode body 27 may be integrally formed with the electrode base 24. Although it is described with reference to the drawing that both the electrode cover 26 and the electrode body 27 are included, examples are not limited thereto. For example, the sensing apparatus 2 may only include one of the electrode cover 26 and the electrode body 27.

Figure 6:
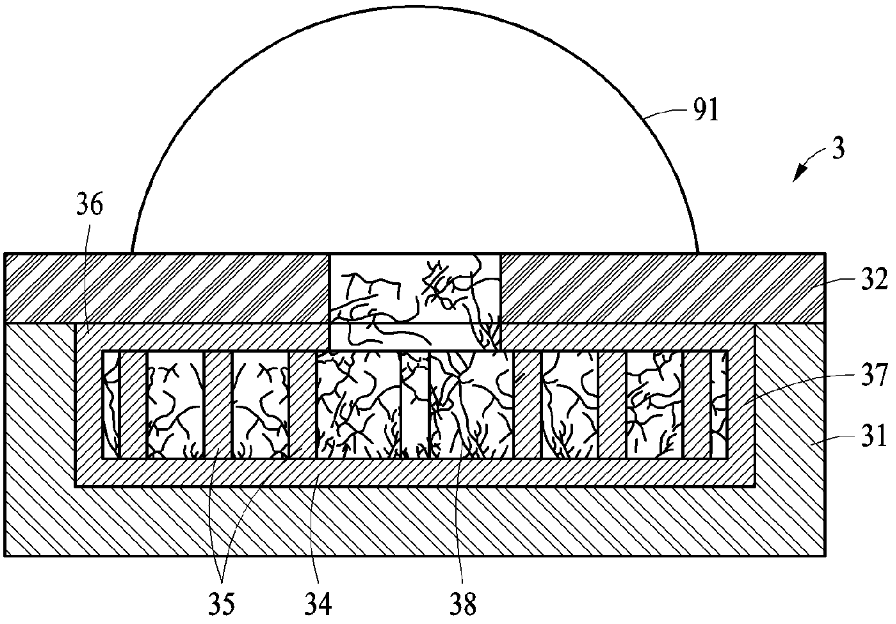
FIG. 6 illustrates an example apparatus for measuring an electrical signal of a cell according to one or more embodiments.

FIG. 6 illustrates an example apparatus for measuring an electrical signal of a cell according to one or more embodiments.

Referring to FIG. 6, a sensing apparatus 3 may be configured to support a cell 91, and sense an electrical signal generated by the cell 91. The sensing apparatus 3 may include a housing 31, a cover 32, an opening, an electrode base 34, electrode rods 35, an electrode cover 36, an electrode body 37, and a conductive polymer 38. Here, the electrode may include at least one of the electrode base 34, the electrode rods 35, the electrode cover 36, the electrode body 37, or the conductive polymer 38. At least one of the electrode rods 35, the electrode cover 36, the electrode body 37, or the conductive polymer 38 may increase the surface area of the electrode compared to the typical electrode in which only the electrode base 34 is provided. As the surface area of the electrode is relatively large compared to the typical electrode, the impedance of the sensing apparatus 3 may decrease.

The conductive polymer 38 may be provided in a liquid state. In one example, the conductive polymer 38 may have a net-shaped conductive structure, which may increase a surface area of a conductive structure inside the housing 31. With the increased surface area, the conductive polymer 38 may thus reduce the impedance of the sensing apparatus 3. The conductive polymer 38 may assist the electrical signal generated by the cell 91 to effectively sense the electrode.

Figure 7:
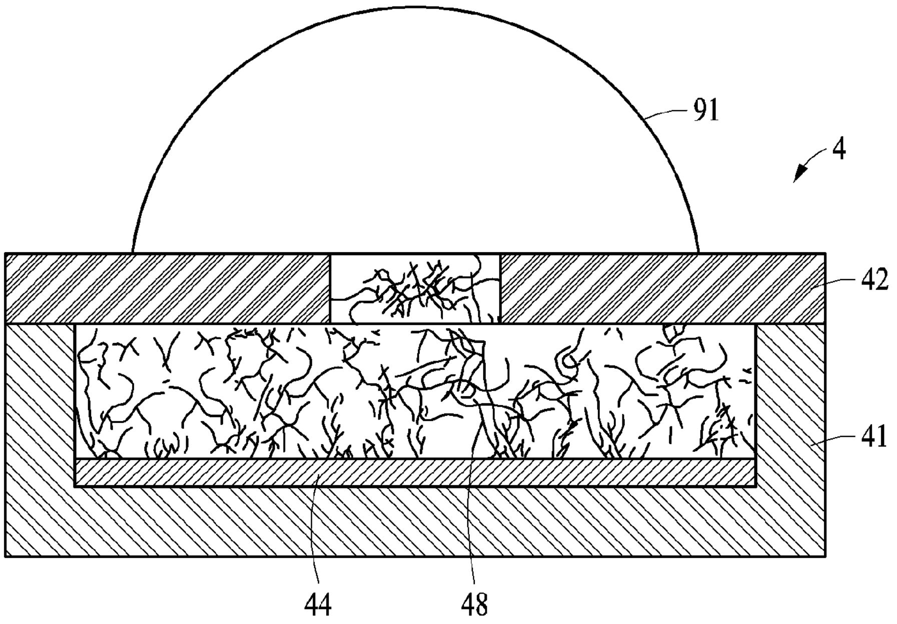
FIG. 7 illustrates an example apparatus for measuring an electrical signal of a cell according to one or more embodiments.

FIG. 7 illustrates an example apparatus for measuring an electrical signal of a cell according to one or more embodiments.

Referring to FIG. 7, a sensing apparatus 4 may be configured to support a cell 91, and sense an electrical signal generated by the cell 91. The sensing apparatus 4 may include a housing 41, a cover 42, an opening, an electrode base 44, and a conductive polymer 48. The conductive polymer 48 may be configured to reduce the impedance of the sensing apparatus 4, and assist the electrical signal generated by the cell 91 to effectively sense the electrode.

FIGS. 8A through 8H illustrate an example manufacturing process of an apparatus for measuring an electrical signal of a cell.

Figure 8A:
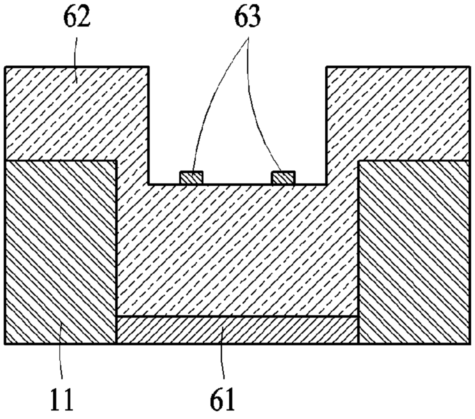
FIGS. 8A through 8H illustrate example manufacturing processes of an apparatus for measuring an electrical signal of a cell according to one or more embodiments.
Figure 8B:
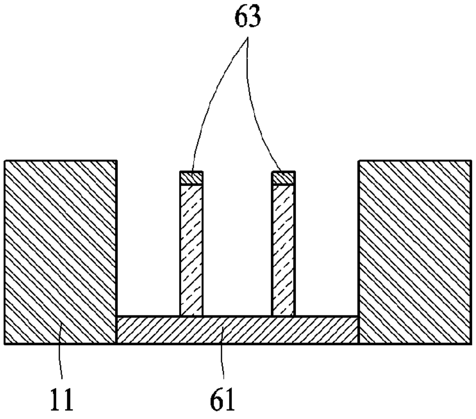
Figure 8C:
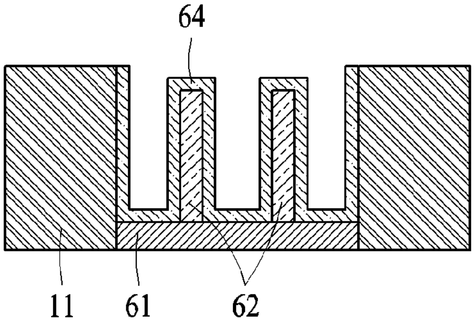
Figure 8D:
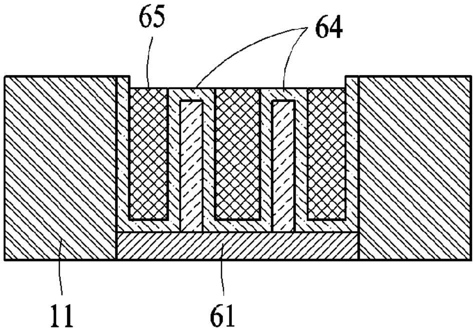
Figure 8E:
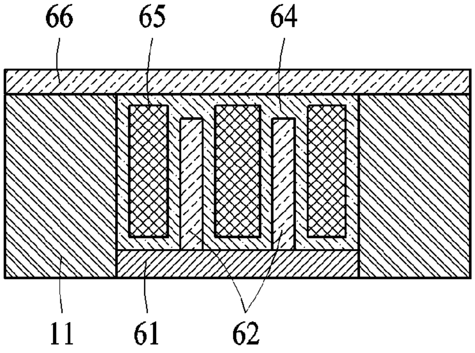
Figure 8F:
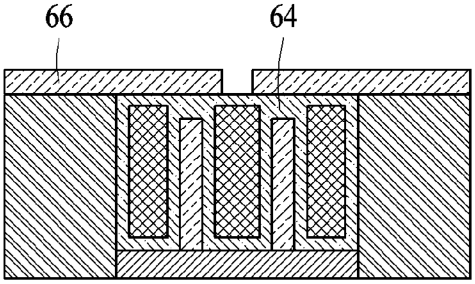
Figure 8G:
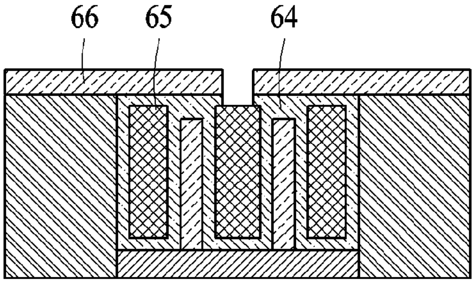
Figure 8H:
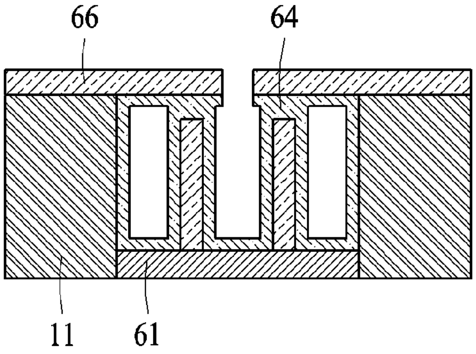

Referring to FIGS. 8A through 8H, in the example manufacturing process, a metal base 61 may be inserted into the housing 11. Here, it is noted that a bottom portion of the housing 11 is omitted for the convenience of description. For example, the metal base 61 may be disposed on the bottom portion of the housing 11 as the electrode base 14. In a state in which the metal base 61 is inserted into the housing 11, silicon 62 may be stacked on the metal base 61 (i.e., the electrode base 14). Next, as shown in FIGS. 8A and 8B, a photoresist 63 may be applied to a portion of the silicon 62 that overlaps the electrode base 14. The photoresist 63 may set positions where respective electrode rods 15 are generated. In a state in which the photoresist 63 is applied, etching may be performed. All areas of the silicon 62 on which the photoresist 63 is not applied may be removed. Areas where the photoresist 63 is applied may be left unremoved. A remaining part of the silicon 62 may become respective cores of the electrode rods 15. Next, as shown in FIG. 8C, a metal deposition agent 64 may be deposited inside the housing 11. The metal deposition agent 64 may be deposited on the bottom portion and sidewall of the housing 11. In addition, the metal deposition agent 64 may be deposited on the remaining portion of the silicon 62. Next, as shown in FIG. 8D, a sacrificial material 65 may be filled inside the housing 11. The sacrificial material 65 may be removed later. In a state in which the sacrificial material 65 is filled, the metal deposition agent 64 may be deposited. Next, as shown in FIG. 8E, a cover 66 may be seated on an upper side of the housing 11 and the metal deposition agent 64. Next, as shown in FIG. 8F, patterning may be performed on the cover 66 to form the opening and the metal deposition agent 64 may be exposed. Next, as shown in FIG. 8G, following the cover 66, the patterning may be additionally performed on the metal deposition agent 64 to expose the sacrificial material 65. Next, as shown in FIG. 8H, the sacrificial material 65 may be removed.

Figure 9A:
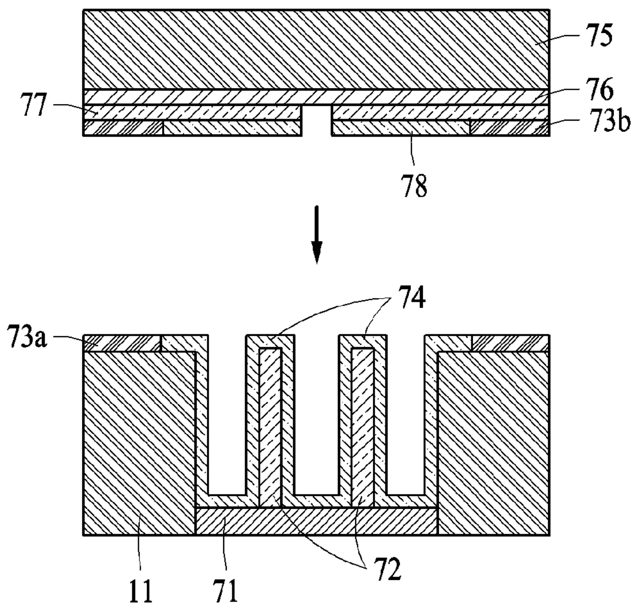
FIGS. 9A and 9B illustrate example manufacturing processes of an apparatus for measuring an electrical signal of a cell according to one or more embodiments.
Figure 9B:
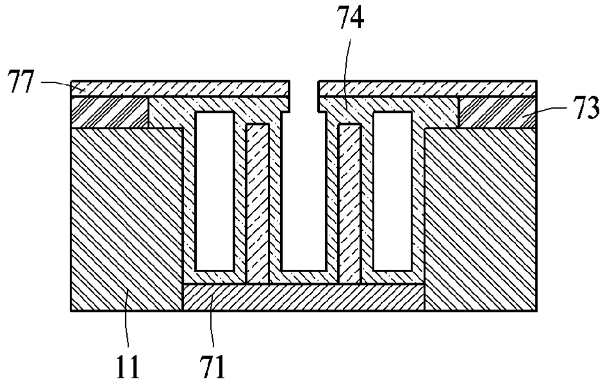

FIGS. 9A and 9B illustrate an example manufacturing process of an apparatus for measuring an electrical signal of a cell.

Referring to FIGS. 9A and 9B, the example apparatus for measuring the electrical signal of the cell may be manufactured in a manner that the apparatus is divided into two parts, which are generated and assembled into one. A first part may include the housing 11, a metal base 71, silicon 72, a first metal deposition agent 74, and a first adhesive layer 73*a*. A second part may include a top substrate 75, a sacrificial material 76, silicon 77, a second metal deposition agent 78, and a second adhesive layer 73*b*. In a non-limiting example 0, as shown in FIG. 9B, the first adhesive layer 73*a* of the first part and the second adhesive layer 73*b* of the second part may be bonded and combined into one bonding adhesive layer 73. The first adhesive layer 73*a* of the first part and the second adhesive layer 73*b* of the second part may be bonded by a thermal bonding method and combined into one bonding adhesive layer 73. The first metal deposition agent 74 of the first part and the second metal deposition agent 78 of the second part may be integrally combined by the thermal bonding method. The first metal deposition agent 74 of the first part and the second metal deposition agent 78 of the second part may be combined by physical contact.

Figure 10A:
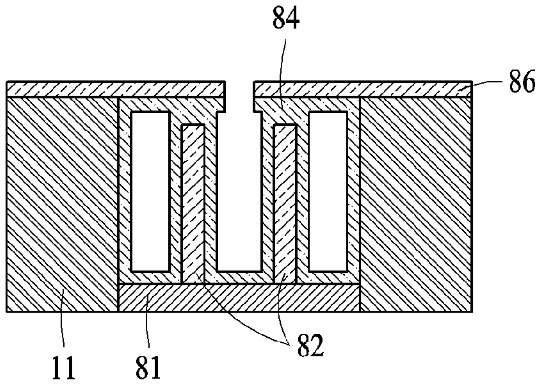
FIGS. 10A through 10C illustrate example manufacturing processes of an apparatus for measuring an electrical signal of a cell according to one or more embodiments.
Figure 10B:
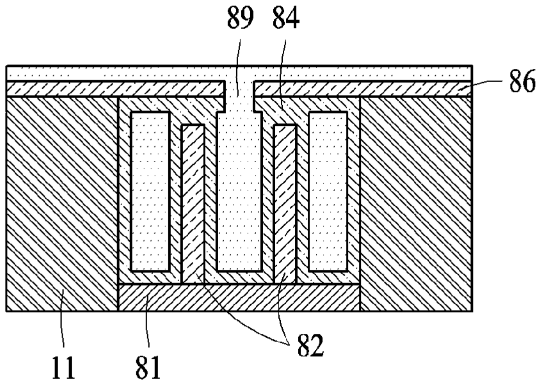
Figure 10C:
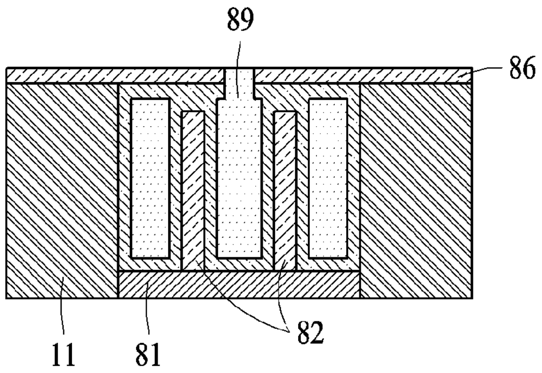

FIGS. 10A through 10C illustrate an example manufacturing process of an apparatus for measuring an electrical signal of a cell.

Referring to FIGS. 10A through 10C, the example apparatus for measuring the electrical signal of the cell may include the housing 11, a metal base 81, silicon 82, a metal deposition agent 84, and a cover 86. A conductive polymer 89 (in FIG. 10B) may be injected into the inside (e.g. the hollow) of the housing 11 in a liquid state. The manufacturing of the sensing apparatus may be completed by removing the conductive polymer 89 that remains on the upper side of the cover 86.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus, comprising:

a housing including a hollow inside;

a cover configured to cover the housing and support a portion of a biological cell on the cover;

an opening formed through the cover and configured to expose at least a portion of the cell to the hollow inside of the housing;

an electrode base disposed on a bottom of the housing; and one or more electrode rods arranged between the electrode base and the cover, and configured to support the cover, wherein the electrode base and/or the one or more electrode rods are arranged for sensing an electrical signal from at least another portion of the cell.

2. The apparatus of claim 1, wherein the one or more electrode rods comprise a plurality of electrode rods, wherein the plurality of electrode rods are spaced apart from each other on the electrode base.

3. The apparatus of claim 2, wherein at least one of the plurality of electrode rods is respectively disposed surrounding the opening.

4. The apparatus of claim 1, wherein the electrode base and the electrode rods are integrally formed.

5. The apparatus of claim 1, further comprising:

an electrode cover attached to the cover and facing the electrode base.

6. The apparatus of claim 5, wherein the electrode cover is integrally formed with the one or more electrode rods.

7. The apparatus of claim 1, further comprising:

an electrode body disposed on a sidewall of the housing other than the electrode base, and facing the one or more electrode rods.

8. The apparatus of claim 7, wherein the electrode body is integrally formed with the electrode base.

9. The apparatus of claim 1, further comprising:

a conductive polymer filled in the hollow inside of the housing to provide an electrical connection of the electrical signal generated by the at least other portion of cell to the electrode base and/or the one or more electrode rods.

10. The apparatus of claim 1, wherein the one or more electrode rods are configured to bear at least a portion of a load of the cover.

11. An apparatus, comprising:

a housing including a hollow inside;

a cover configured to cover the housing and support a portion of a biological cell on the cover;

an opening formed through the cover and configured to expose at least a portion of the cell to the hollow inside of the housing;

an electrode base disposed on a bottom of the housing; and a conductive polymer material filled in the hollow inside of the housing to provide an electrical connection of an electrical signal generated by at least another portion of the cell to the electrode base.

12. The apparatus of claim 11, further comprising one or more electrode rods configured to support the cover with respect to the electrode base.

* * * * *